(12) United States Patent
Koji et al.

(10) Patent No.: US 11,342,114 B2
(45) Date of Patent: May 24, 2022

(54) LEAKAGE TRANSFORMER

(71) Applicant: Mitsubishi Electric Corporation, Tokyo (JP)

(72) Inventors: Yoshinobu Koji, Tokyo (JP); Wataru Okuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 672 days.

(21) Appl. No.: 16/315,875

(22) PCT Filed: Jul. 13, 2016

(86) PCT No.: PCT/JP2016/070735
§ 371 (c)(1),
(2) Date: Jan. 7, 2019

(87) PCT Pub. No.: WO2018/011924
PCT Pub. Date: Jan. 18, 2018

(65) Prior Publication Data
US 2019/0304676 A1    Oct. 3, 2019

(51) Int. Cl.
*H01F 38/08*  (2006.01)
*H01F 27/26*  (2006.01)
(Continued)

(52) U.S. Cl.
CPC ............. *H01F 38/08* (2013.01); *H01F 27/24* (2013.01); *H01F 27/26* (2013.01); *H01F 27/28* (2013.01); *H02M 7/537* (2013.01)

(58) Field of Classification Search
CPC ........ H01F 38/08; H01F 27/34; H01F 27/346; H01F 27/38; H01F 27/24; H01F 17/04;
(Continued)

(56) References Cited

U.S. PATENT DOCUMENTS 2,963,669 A  * 12/1960 Salisbury ................ H01F 17/02
                                                336/192
5,053,738 A    10/1991 Sato et al.
(Continued)

FOREIGN PATENT DOCUMENTS

JP     S54-020328 A     2/1979
JP       56079415 A  *  6/1981  ............. H01F 38/10
(Continued)

OTHER PUBLICATIONS

Office Action (Notification of Reasons for Refusal) dated Mar. 19, 2019, by the Japan Patent Office in corresponding Japanese Patent Application No. 2018-527318 and English translation of the Office Action. (8 pages).
(Continued)

*Primary Examiner* — Tszfung J Chan
(74) *Attorney, Agent, or Firm* — Buchanan Ingersoll & Rooney PC

(57)  ABSTRACT

A leakage transformer includes a secondary coil wound around a leg member of a core, and a primary coil wound around the leg member outside of the secondary coil. Between the primary coil and the secondary coil, (i) spacers of non-magnetic members and (ii) bypass cores that are magnetic members to induce therein a portion of magnetic flux generated in the core are arranged. The bypass cores are arranged with gaps therebetween in a direction of the internally induced magnetic flux. A total value of the gaps between the bypass cores is determined in accordance with a target value of leakage inductance. A maximum value of the gaps between the bypass cores is less than or equal to a value obtained by multiplying a minimum value of gaps between the bypass cores and each of the primary coil and the secondary coil by a positive coefficient less than one.

17 Claims, 13 Drawing Sheets

(51) Int. Cl.
*H01F 27/28* (2006.01)
*H02M 7/537* (2006.01)
*H01F 27/24* (2006.01)

(58) Field of Classification Search
CPC ...... H01F 27/26; H01F 3/10; H01F 2003/106; H01F 3/12; H01F 2038/426; H01F 3/14
USPC .................. 336/178, 212–215, 220–222
See application file for complete search history.

(56) References Cited

U.S. PATENT DOCUMENTS

| | | | | |
|---|---|---|---|---|
| 5,315,982 | A | * | 5/1994 | Ward ...................... H01F 38/12 123/598 |
| 6,980,077 | B1 | * | 12/2005 | Chandrasekaran ... H01F 27/255 336/212 |
| 2015/0256061 | A1 | | 9/2015 | Koji et al. |
| 2015/0279552 | A1 | * | 10/2015 | Ginglseder ........... H01F 17/043 336/178 |
| 2015/0302981 | A1 | | 10/2015 | Kaneko et al. |

FOREIGN PATENT DOCUMENTS

| | | | | | |
|---|---|---|---|---|---|
| JP | 56079415 | A | | 6/1981 | |
| JP | S57-130402 | U | | 8/1982 | |
| JP | S64-041114 | U | | 3/1989 | |
| JP | 03166708 | A | | 7/1991 | |
| JP | 04012015 | B2 | | 3/1992 | |
| JP | 05299264 | A | | 11/1993 | |
| JP | 08008131 | A | | 1/1996 | |
| JP | 08288086 | A | | 11/1996 | |
| JP | 09180951 | A | | 7/1997 | |
| JP | 200021659 | A | | 1/2000 | |
| JP | 2000021659 | A | * | 1/2000 | |
| JP | 200735664 | A | | 2/2007 | |
| JP | 3187497 | U | * | 12/2013 | |
| JP | 3187497 | U | | 12/2013 | |
| WO | 2013124941 | A1 | | 8/2013 | |
| WO | WO-2013124941 | A1 | * | 8/2013 | ........... H01F 27/346 |
| WO | 2014061154 | A1 | | 4/2014 | |
| WO | WO-2014061154 | A1 | * | 4/2014 | ........... H01F 27/306 |

OTHER PUBLICATIONS

International Search Report (PCT/ISA/210) dated Sep. 20, 2016, by the Japan Patent Office as the International Searching Authority for International Application No. PCT/JP2016/070735.
Office Action (Notice of Reasons for Refusal) dated Jun. 4, 2019, by the Japan Patent Office in corresponding Japanese Patent Application No. 2018-527318 and English translation of the Office Action. (12 pages).

* cited by examiner

LEAKAGE TRANSFORMER

TECHNICAL FIELD

The present disclosure relates to a leakage transformer.

BACKGROUND ART

In a leakage transformer, a bypass core that is a magnetic member is inserted between a primary coil and a secondary coil wound around a core, and the bypass core is a magnetic flux path for a leakage magnetic flux.

In a transformer disclosed in Patent Literature 1, the bypass core is divided, and the transformer is equipped with a gap having a freely set spacing in the interval of the gap.

CITATION LIST

Patent Literature

Patent Literature 1: Examined Japanese Patent Application Publication No. H04-012015

SUMMARY OF INVENTION

Technical Problem

In the transformer disclosed in Patent Literature 1, the interval of the gap is set so as to adjust saturation of the leakage magnetic flux. When the interval of the gap is set, a portion of the magnetic flux leaks when an operating frequency of an inverter device, for example, connected to the primary side of the transformer rises. The leakage magnetic flux may interlink with the primary coil and the secondary coil so that eddy currents are generated. The transformer may suffer from localized heating in the primary coil and the secondary coil due to the generation of eddy currents.

The present disclosure is achieved in consideration of the aforementioned circumstances, and an objective of the present disclosure is to suppress or prevent the generation of localized heating in the leakage transformer.

Solution to Problem

In order to achieve the aforementioned objective, a leakage transformer of the present disclosure includes: a primary coil wound around a core, a secondary coil wound around the core, a plurality of bypass cores, and at least one non-magnetic member arranged between the bypass cores. The bypass cores are arranged between the primary coil and the secondary coil, and are magnetic members in which a portion of the magnetic flux generated by the core is internally induced. The plurality of bypass cores are disposed with gaps therebetween in a direction of the internally induced magnetic flux. A total value of the gaps of the bypass cores is determined in accordance with a target value of leakage inductance. A maximum value of the gaps of the bypass cores is less than or equal to a value obtained by multiplying a minimum value of gaps between the bypass cores and each of the primary coil and the secondary coil by a positive coefficient less than one.

Advantageous Effects of Invention

According to the present disclosure, localized heating in the leakage transformer can be suppressed or prevented by making the maximum value of the gaps of the bypass cores disposed between the primary coil and the secondary coil less than or equal to a value obtained by multiplying the minimum value of the gaps between the bypass cores and each of the primary coil and the secondary coil by the positive coefficient less than one.

DESCRIPTION OF EMBODIMENTS

Figure 1:
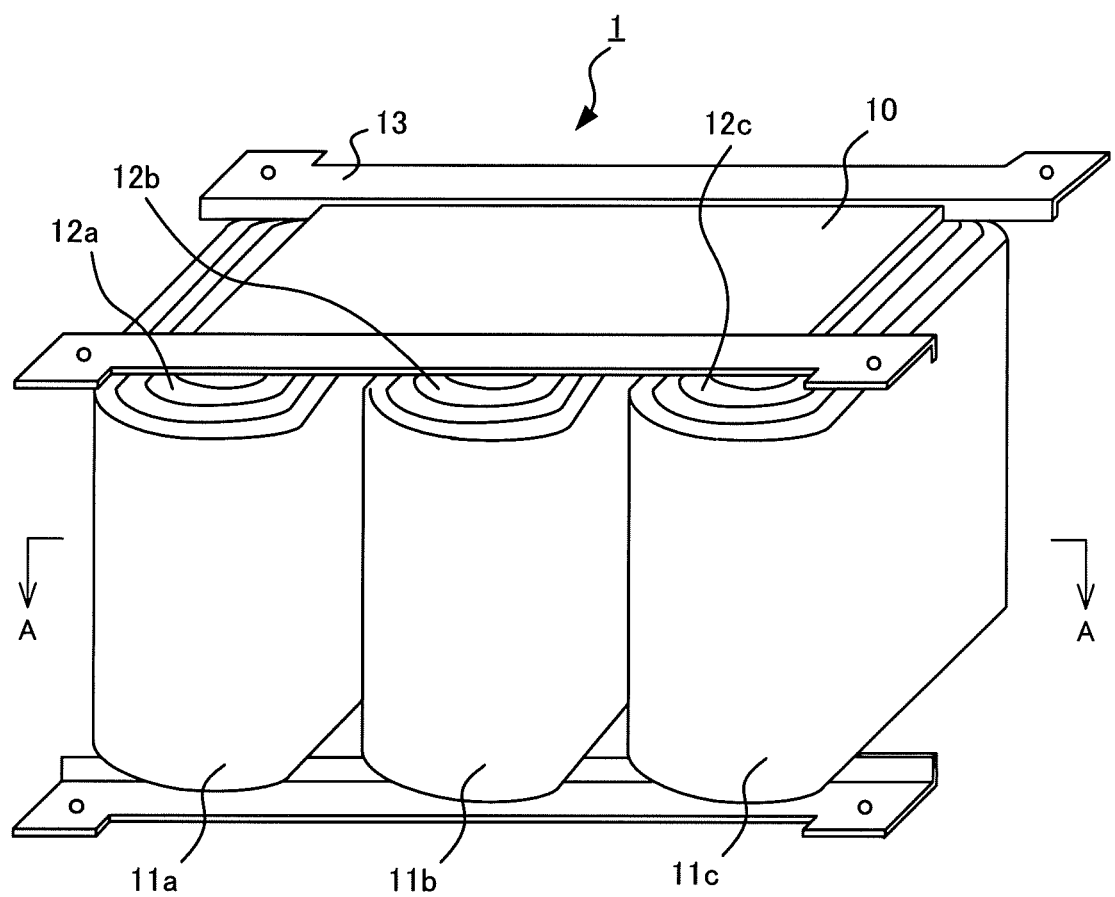
FIG. 1 is a perspective view of a leakage transformer according to an embodiment of the present disclosure.

Embodiments of the present disclosure are described below in detail with reference to drawings. In the drawings, components that are the same or equivalent are assigned the same reference sign.

Figure 2:
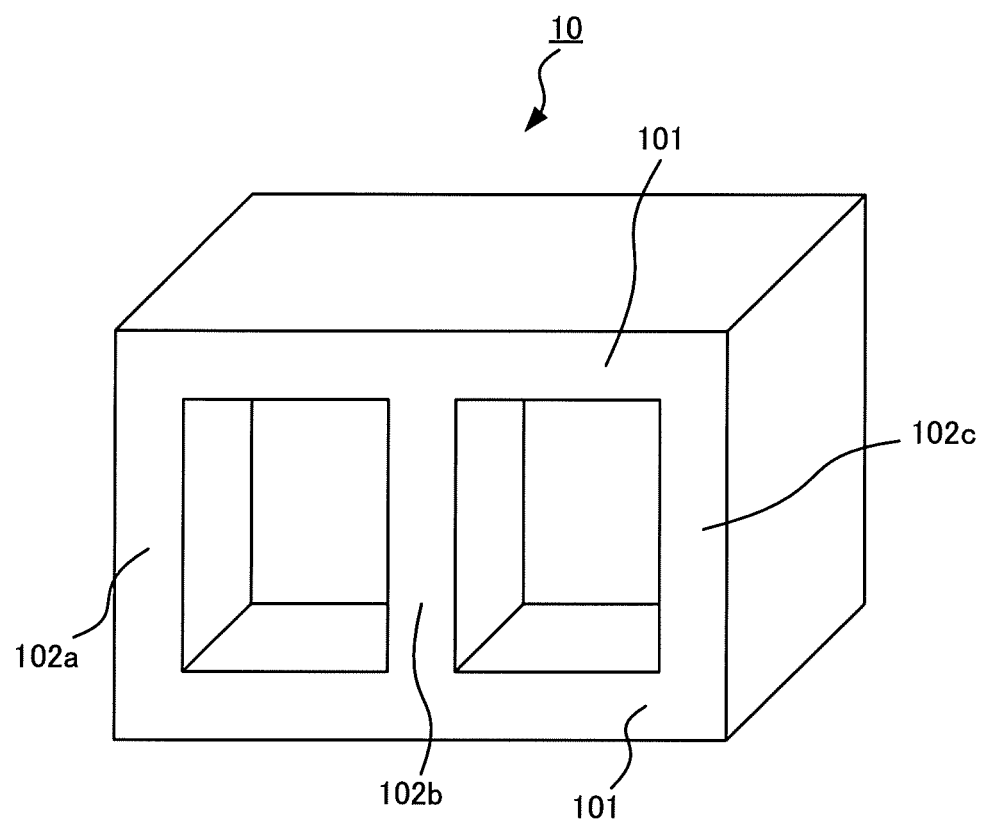
FIG. 2 is a perspective view of a core of the leakage transformer according to the embodiment.

FIG. 1 is a perspective view of a leakage transformer according to an embodiment of the present disclosure. FIG. 2 is a perspective view of a core of the leakage transformer according to the embodiment. A leakage transformer 1 is a three-phase transformer in the example of FIGS. 1 and 2. The leakage transformer 1 is equipped with a core 10 and with primary coils 11a, 11b, and 11c and secondary coils 12a, 12b, and 12c wound around the core 10. For example, a U phase current flows in the primary coil 11a and the secondary coil 12a, a V phase current flows in the primary coil 11b and the secondary coil 12b, and a W phase current flows in the primary coil 11c and the secondary coil 12c.

In the example of FIG. 2, the core 10 has two end portions 101 facing each other, and leg members 102a, 102b, and 102c, each of which connects at both ends to the end portions 101. In the example of FIGS. 1 and 2, the secondary coil 12a is wound around the leg member 102a, and the primary coil 11a is wound around the leg member 102a at the outside of the secondary coil 12a. The central axis of the primary coil 11a is aligned with the central axis of the secondary coil 12a. In the same manner, the secondary coil 12b is wound around the leg member 102b, and the primary coil 11b is wound around the leg member 102b at the outside of the secondary coil 12b. The central axis of the primary coil 11b is aligned with the central axis of the secondary coil 12b. In the same manner, the secondary coil 12c is wound around the leg member 102c, and the primary coil 11c is wound around the leg member 102c at the outside of the secondary coil 12c. The central axis of the primary coil 11c is aligned with the central axis of the secondary coil 12c. The core 10 as well as the primary coils 11a, 11b, and 11c and the secondary coils 12a, 12b, and 12c are fixed by a clamper 13.

Figure 3:
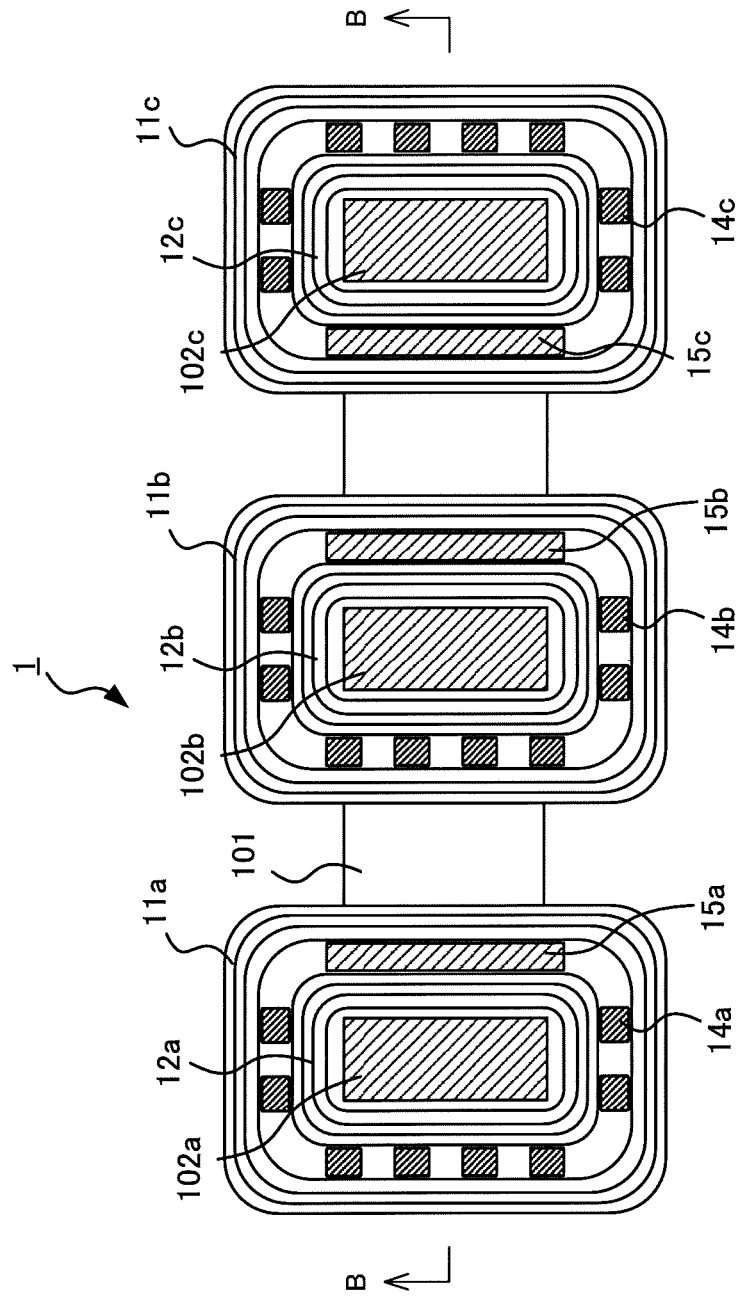
FIG. 3 is a cross-sectional view of the leakage transformer according to the embodiment.

FIG. 3 is a cross-sectional view of the leakage transformer according to the embodiment. FIG. 3 is a cross-sectional view of the leakage transformer 1 taken along line A-A of FIG. 1, that is to say, is a cross-sectional view of the leakage transformer 1 taken along a cross section orthogonal to the central axes of the primary coils 11a, 11b, and 11c and the secondary coils 12a, 12b, and 12c. Spacers 14a that are non-magnetic members are provided between the primary coil 11a and the secondary coil 12a. By providing of spacers 14a, a flow path for air is formed between the spacers 14a. Heat generated by the primary coil 11a and the secondary coil 12a is transmitted to the air passing through the flow path formed by the spacers 14a. Such configuration suppresses or prevents a rise in temperature of the primary coil 11a and the secondary coil 12a. In a similar manner, spacers 14b are provided between the primary coil 11b and the secondary coil 12b, and a rise in temperature of the primary coil 11b and the secondary coil 12b is suppressed or prevented. In a similar manner, spacers 14c are provided between the primary coil 11c and the secondary coil 12c, and a rise in temperature of the primary coil 11c and the secondary coil 12c is suppressed or prevented.

Bypass cores 15a that are magnetic members are provided between the primary coil 11a and the secondary coil 12a. In the same manner, bypass cores 15b that are magnetic members are provided between the primary coil 11b and the secondary coil 12b, and bypass cores 15c that are magnetic members are provided between the primary coil 11c and the secondary coil 12c. A portion of the magnetic flux generated in the core 10 is induced within the bypass cores 15a, 15b, and 15c. The bypass cores 15a, 15b, and 15c are disposed at positions nearest the center in the disposal direction of the leg members 102a, 102b, and 102c. As illustrated in FIGS. 2 and 3, in the case in which the core 10 has the three leg members 102a, 102b, and 102c, the bypass cores 15a are arranged adjacent the leg member 102b within the interval between the primary coil 11a and the secondary coil 12a. In the example illustrated in FIG. 3, the bypass cores 15b are arranged adjacent the leg member 102c within the interval between the primary coil 11b and the secondary coil 12b. Due to winding of the primary coil 11b and the secondary coil 12b on the leg member 102b that is positioned centrally in the aforementioned disposal direction, the bypass cores 15b may be arranged adjacent the leg member 102a within the interval between the primary coil 11b and the secondary coil 12b. The bypass cores 15c are arranged adjacent to the leg member 102b within the interval between the primary coil 11c and the secondary coil 12c. In FIG. 3, although insulation members are not illustrated, the core 10, the primary coils 11a, 11b, and 11c, the secondary coils 12a, 12b, and 12c, and the bypass cores 15a, 15b, and 15c are insulated from each other.

Figure 4:
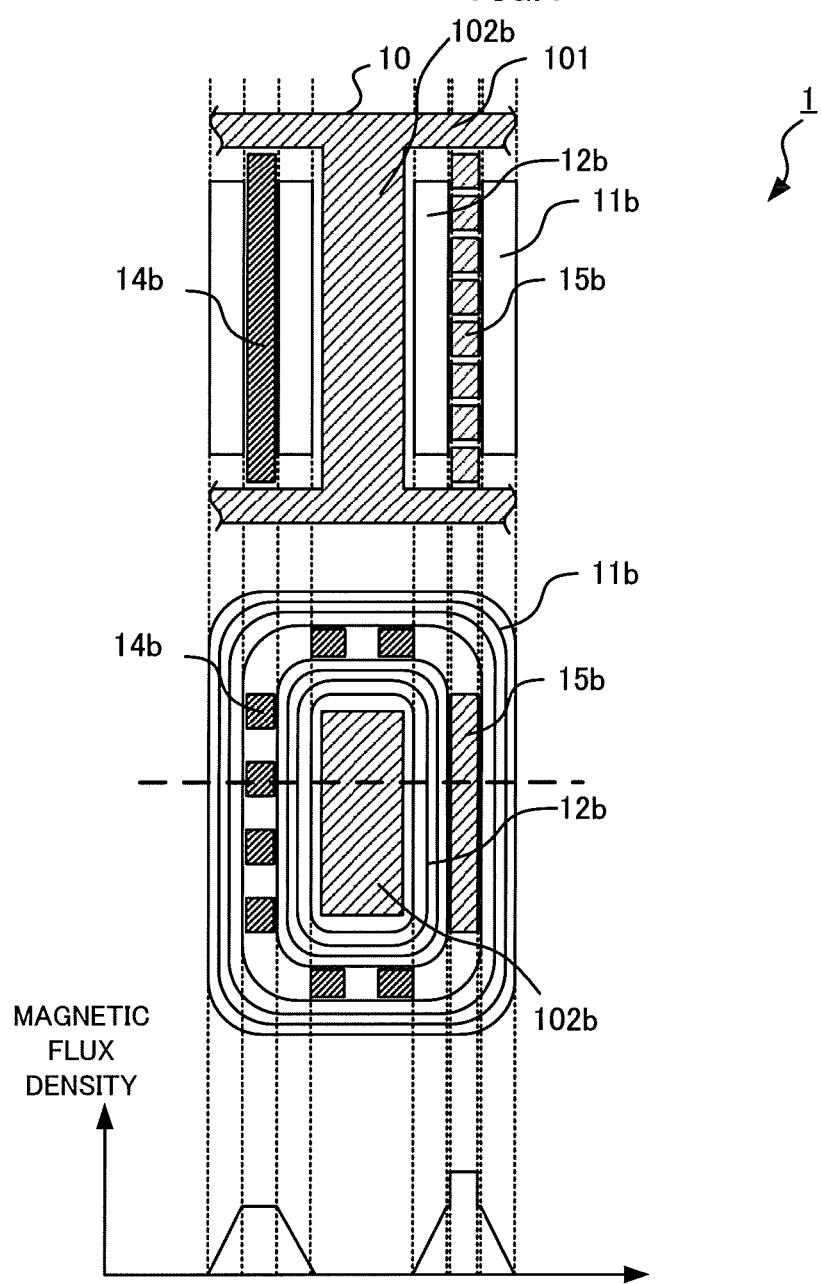
FIG. 4 is a partial cross-sectional view of the leakage transformer according to the embodiment.

FIG. 4 is a partial cross-sectional view of the leakage transformer according to the embodiment. FIG. 4 illustrates the primary coil 11b and the secondary coil 12b wound around the leg member 102b. The upper part of FIG. 4 is a partial cross-sectional view of the leakage transformer 1 taken along line B-B of FIG. 3, that is to say, is a partial cross-sectional view of the leakage transformer 1 taken along a plane that includes the central axes of the primary coil 11b and the secondary coil 12b. The central part of FIG. 4 is a portion of the cross-sectional view of FIG. 3. The lower part of FIG. 4 illustrates a change in magnetic flux density on the broken line of the central part of FIG. 4. The vertical axis of the lower part of FIG. 4 indicates magnetic flux density.

As illustrated in the upper part in FIG. 4, the leakage transformer 1 has the bypass cores 15b arranged between the primary coil 11b and the secondary coil 12b. As illustrated in the lower part of FIG. 4, a magnetic flux is induced in the bypass cores 15b. The bypass cores 15b are disposed at intervals in the direction of the internally induced magnetic flux. In the example of FIG. 4, gaps are formed along a direction parallel to the central axes of the primary coil 11b and the secondary coil 12b. The non-magnetic members are arranged between the bypass cores 15b. In the example of FIG. 4, air forms the non-magnetic members positioned between the bypass cores 15b. The example of FIG. 4 is not limiting, and non-magnetic members of paper, resin, plastic, and the like may be arranged between the bypass cores 15b.

Figure 5:
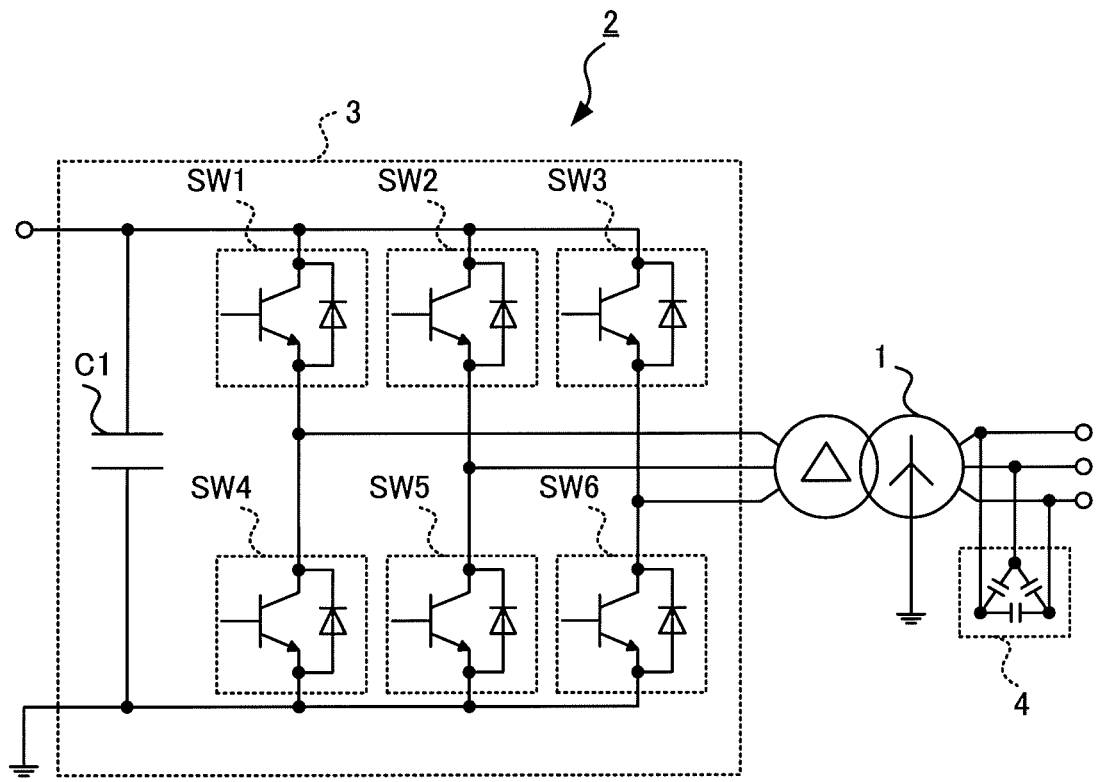
FIG. 5 is a drawing illustrating an example configuration of a power converter that has the leakage transformer according to the embodiment.

FIG. 5 is a drawing illustrating an example configuration of a power converter that has the leakage transformer according to the embodiment. A power converter 2 converts an inputted direct current voltage into a three-phase alternating current voltage and outputs the alternating current voltage. The power converter 2 is equipped with: an inverter device 3 that converts the direct current voltage applied to a filter capacitor C1 to an alternating current voltage and outputs the alternating current voltage to the primary side of the leakage transformer 1, the leakage transformer 1, and an alternating current capacitor 4 connected to the secondary side of the leakage transformer 1. Switching elements SW1, SW2, SW3, SW4, SW5, and SW6 included in the inverter device 3 are controlled by a non-illustrated controller to turn on or off. The controller performs control such as pulse width modulation (PWM) control to control the switching elements SW1, SW2, SW3, SW4, SW5, and SW6. The switching elements SW1, SW2, SW3, SW4, SW5, and SW6 are formed from a wide bandgap semiconductor using, for example, silicon carbide, a gallium nitride-based material, or diamond. The direct current voltage applied to the filter capacitor C1 is converted to a three-phase alternating current voltage by on-off operation of the switching elements SW1, SW2, SW3, SW4, SW5, and SW6. In the example of FIG. 5, the leakage transformer 1 is a delta-star type three-phase transformer. When the power converter 2 is mounted on an electric railway vehicle, a direct current of 1,500V, for example, from a power line is input to the power converter 2 via a pantograph and a direct current filter reactor. Providing of the direct current filter reactor prevents high frequency current from being input to the power converter 2.

Figure 6:
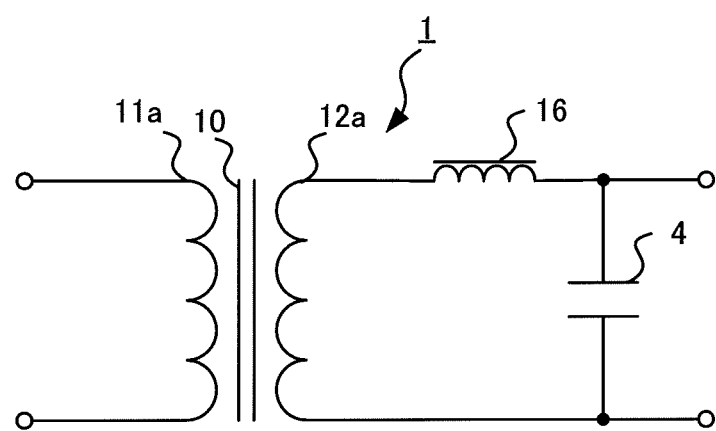
FIG. 6 is a drawing illustrating an equivalent circuit of the leakage transformer according to the embodiment.

FIG. 6 is a drawing illustrating an equivalent circuit of the leakage transformer according to the embodiment. FIG. 6 is an equivalent circuit of one phase portion of the leakage transformer 1, such as an equivalent circuit of the U phase. A leakage inductance 16 of the leakage transformer 1 and the alternating current capacitor 4 form an LC filter, and the waveform of the voltage of the secondary side of the leakage transformer 1 is shaped to become a sine wave.

Figure 7:
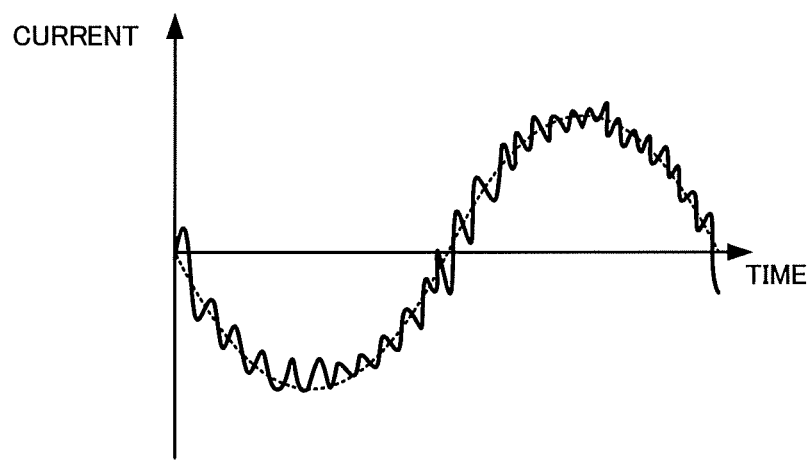
FIG. 7 is a drawing illustrating an example of an input current of the leakage transformer according to the embodiment.
Figure 8:
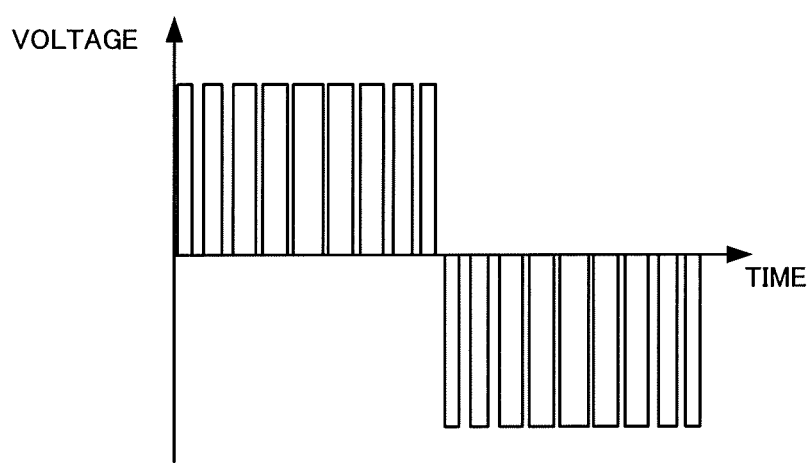
FIG. 8 is a drawing illustrating an example of an input voltage of the leakage transformer according to the embodiment.
Figure 9:
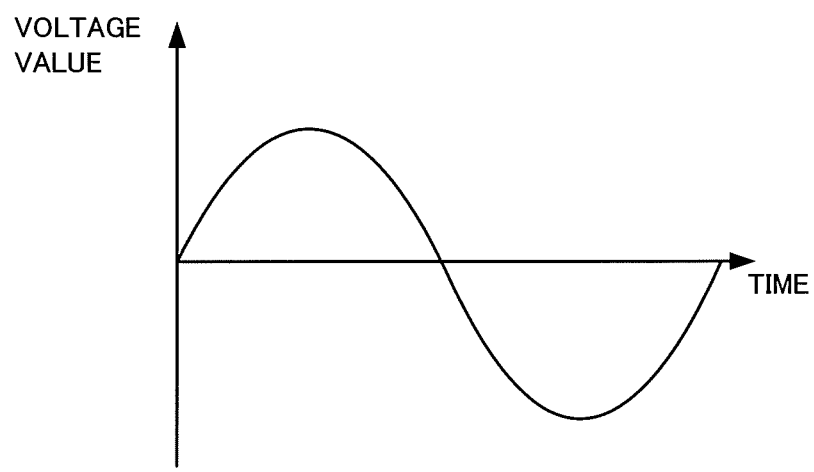
FIG. 9 is a drawing illustrating an example of an output voltage of the power converter according to the embodiment.

FIG. 7 is a drawing illustrating an example of the input current of the leakage transformer according to the embodiment. FIG. 7 illustrates the input current of the leakage transformer 1 of the power converter 2 illustrated in FIG. 5. The horizontal axis indicates time, and the vertical axis indicates a value of the input current of one phase portion of the leakage transformer 1, such as the U phase. The dashed line in FIG. 7 indicates the current at the fundamental frequency. For example, in the case in which the inverter device 3 performing PWM control is connected to the primary side and the operation frequency is 5 kHz, the input current of the leakage transformer 1 as illustrated by the solid line in FIG. 7 includes, in addition of the current at the fundamental frequency, high frequency current that is generated due to PWM control. FIG. 8 is a drawing illustrating an example of the input voltage of the leakage transformer according to the embodiment. The horizontal axis indicates time, and the vertical axis indicates a value of the input voltage of one phase portion of the leakage transformer 1, such as the U phase. As illustrated in FIG. 8, the input voltage of the leakage transformer 1 has a rectangular waveform. FIG. 9 is a drawing illustrating an example of the output voltage of the power converter according to the embodiment. The horizontal axis indicates time, and the vertical axis indicates the value of the output voltage of one phase portion of the leakage transformer 1, such as the U phase. In the aforementioned manner, due to the LC filter formed by the leakage inductance 16 and the alternating current capacitor 4, the secondary voltage of the leakage transformer 1 is shaped, and the output voltage of the power converter 2 becomes a sine wave as illustrated in FIG. 9.

Figure 10:
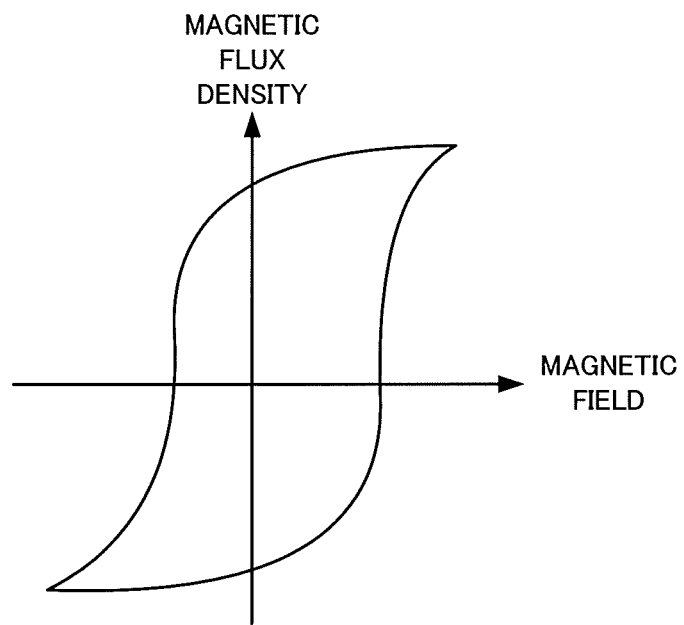
FIG. 10 is a drawing illustrating an example of a magnetic hysteresis curve of the leakage transformer according to the embodiment.
Figure 11:
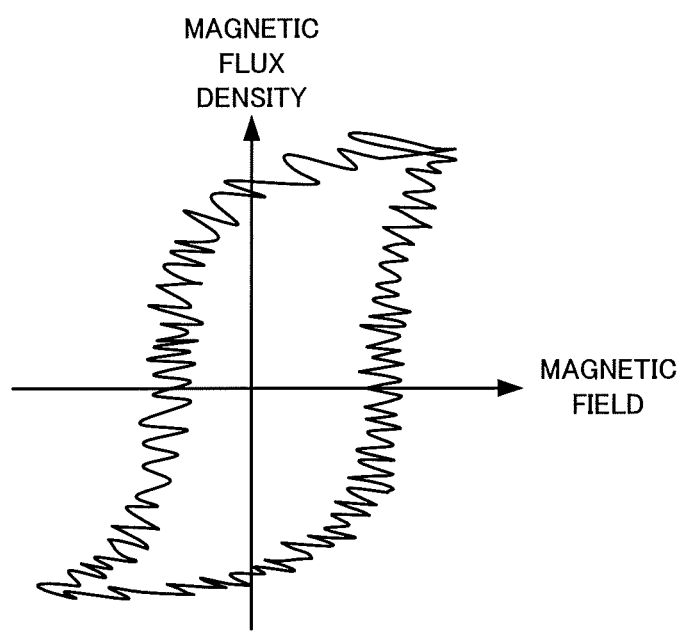
FIG. 11 is a drawing illustrating a different example of the magnetic hysteresis curve of the leakage transformer according to the embodiment.

FIGS. 10 and 11 are drawings illustrating examples of magnetic hysteresis curves of the leakage transformer according to the embodiment. The horizontal axis indicates the magnetic field, and the vertical axis indicates the magnetic flux density. FIG. 10 is the magnetic hysteresis curve of the leakage transformer 1 when a power conversion circuit for which the switching elements are sine wave-driven is connected to the primary side. FIG. 11 illustrates the magnetic hysteresis curve of the leakage transformer 1 when the inverter device 3 performing PWM control is connected to the primary side. The magnetic hysteresis curve illustrated in FIG. 11 includes high frequency components that are generated due to PWM control.

A high frequency component leakage magnetic flux is generated in the flow path formed by the spacers 14a between the primary coil 11a and the secondary coil 12a, and a portion of the leakage magnetic flux interlinks the primary coil 11a and the secondary coil 12a. When a magnetic flux density of the leakage magnetic flux interlinked with the primary coil 11a is taken to be B, a frequency of the input current of the leakage transformer 1 is taken to be f, a thickness in the direction orthogonal to the central axis of the primary coil 11a is taken to be t, and a resistivity of the primary coil 11a is taken to be ρ, then an eddy current loss Pe per unit area is generated in the primary coil 11a indicated by Equation (1) below. For example, when the primary coil 11a is copper, the eddy current loss Pe per unit area is expressed by Equation (2) below. The magnetic flux density B can be found by electromagnetic field analysis.

Equation 1
$$Pe[W/m^3] = \frac{1}{6\rho}(\pi \cdot f \cdot B \cdot t)^2 \qquad (1)$$

Equation 2
$$Pe[W/m^3] = 7.83 \times 10^7 \times (f \cdot B \cdot t)^2 \qquad (2)$$

The leakage magnetic flux enters the interior of the primary coil 11a to a skin depth δ due to the skin effect. Taking absolute permeability of the primary coil 11a to be μ, the skin depth δ is expressed by Equation (3) below. For example, when the primary coil 11a is copper, the skin depth δ is expressed by Equation (4) below.

Equation 3
$$\delta[mm] = \sqrt{\frac{2\rho}{2\pi f \mu}} \qquad (3)$$

Equation 4
$$\delta[mm] = \frac{65.5}{\sqrt{f}} \qquad (4)$$

The leakage magnetic fluxes of the high frequency components concentrate at the position of the skin depth δ Thus the thickness t in the direction orthogonal to the central axis of the primary coil 11a is taken to be less than or equal to 2δ in the present embodiment. In the same manner as the primary coil 11a, an eddy current loss Pe per unit area is generated also in the secondary coil 12a. Further, the leakage magnetic flux enters the interior of the secondary coil 12a to the skin depth δ due to the skin effect. Thus the depth in the direction orthogonal to the central axis of the secondary coil 12a in a similar manner is taken to be less than or equal to 2δ also in the secondary coil 12a. In a similar manner, the thickness in the direction orthogonal to the central axis of each of the primary coils 11b and 11c and the secondary coils 12b and 12c is each taken to be less than or equal to 2δ.

Figure 12:
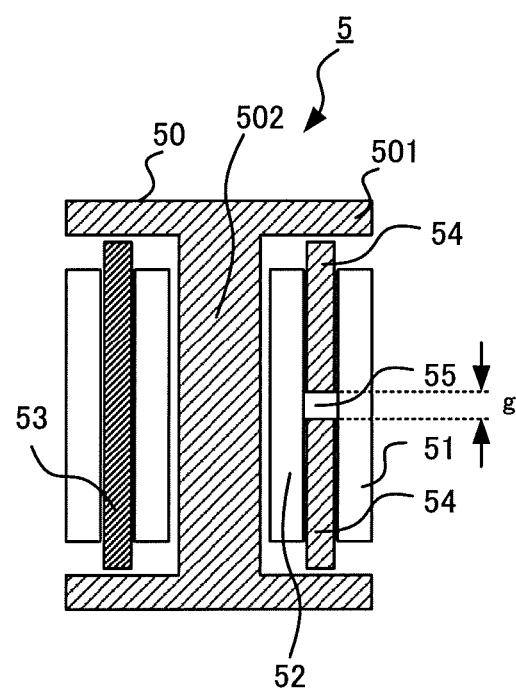
FIG. 12 is a partial cross-sectional view of a leakage transformer in which bypass cores form a gap therebetween.

FIG. 12 is a partial cross-sectional view of a leakage transformer in which bypass cores form a gap therebetween. This drawing is annotated in the same manner as the upper part of FIG. 4. A core 50 of a leakage transformer 5 is configured similarly to the core 10 of the leakage transformer 1 according to the embodiment illustrated in FIG. 2. A secondary coil 52 is wound around a leg member 502 of the core 50. A primary coil 51 is wound around the leg member 502 on the outside of the secondary coil 52. The central axis of the primary coil 51 is aligned with the central axis of the secondary coil 52. A spacer 53 that is a non-magnetic member is arranged between the primary coil 51 and the secondary coil 52. A flow path for air is formed by the spacer 53. Two bypass cores 54 that are magnetic members are arranged between the primary coil 51 and the secondary coil 52. A portion of the flux generated by the core 50 is induced in the bypass cores 54. A gap 55 is formed between the two bypass cores 54. In the example illustrated in FIG. 12, air that is a non-magnetic member is positioned in the gap 55. A length g in the spacing direction of the gap 55, that is, the length in the direction parallel to the central axes of the primary coil 51 and the secondary coil 52, is determined in accordance with a target value of the leakage inductance.

A magnetic resistance R of the leakage inductance can be regarded as being equal to a magnetic resistance Rg generated in the gap 55. Taking a winding count of the primary coil 51 to be n1, and taking the cross-sectional area of the bypass core 54 in a cross section orthogonal to the central axes of the primary coil 51 and the secondary coil 52 to be Ag, the magnetic resistance of the leakage inductance is expressed by Equation (5) below, and a leakage inductance L is expressed by Equation (6) below. The magnetic permeability of air can be regarded to be the same as the magnetic permeability of the vacuum, and thus the magnetic permeability $\mu_0$ of the vacuum is used as the magnetic permeability of air.

Equation 5

$$R \approx Rg = \frac{g}{\mu_0 \cdot Ag} \quad (5)$$

Equation 6

$$L = \frac{n1^2}{R} \approx \frac{n1^2}{Rg} = n1^2 \cdot \frac{\mu_0 \cdot Ag}{g} \quad (6)$$

The winding count n1 of the primary coil 51 and the cross-sectional area Ag of the bypass core 54 are determined in accordance with the design of the leakage transformer 5. Thus adjustment of the spacing direction length g of the gap 55 is required in order to obtain a desired leakage inductance L.

Figure 13:
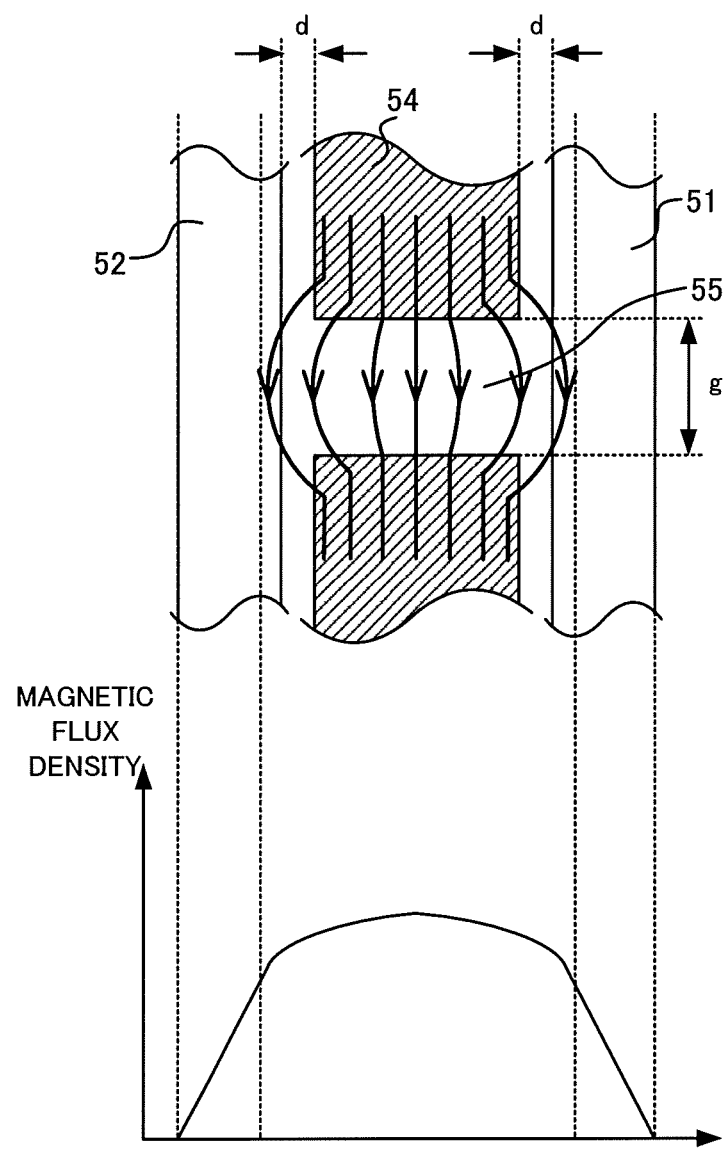
FIG. 13 is a drawing illustrating an example of a fringing magnetic flux generated in the gap between the bypass cores.

FIG. 13 is a drawing illustrating an example of a fringing magnetic flux generated in the gap between the bypass cores. The upper part of FIG. 13 illustrates the magnetic force lines in a partial magnified view of FIG. 12. The lower part of FIG. 13 illustrates the change of magnetic flux density generated in the gap 55. The spacing direction length g of the gap 55, in the aforementioned manner, is determined in accordance with the target value of the leakage inductance L. In the example of FIG. 13, the spacing direction length g of the gap 55 is larger than the gap d between the bypass core 54 and each of the primary coil 51 and the secondary coil 52. Further, the gap d is determined in accordance with the insulation design of the leakage transformer 5. In this case, the magnetic resistance Rg passing through the gap 55 and the magnetic resistance Ra passing through a position nearer the primary coil 51 or the secondary coil 52 than then gap 55 can be considered to be equal. Thus the magnetic flux spreads as illustrated in the upper part of FIG. 13, and interlinks the primary coil 51 and the secondary coil 52. Due to the leakage magnetic flux from the bypass core 54 interlinking with the primary coil 51 and the secondary coil 52, eddy currents are generated in the primary coil 51 and the secondary coil 52, and localized heating may be generated.

For the leakage transformer 5 illustrated in FIG. 12, the spacing direction length g of the gap 55 is determined by the aforementioned Equation (6) in accordance with the target value of the leakage inductance. However, for the leakage transformer 1 according to the present embodiment, the total value of the gaps of the plurality of bypass cores 15a is determined by the aforementioned Equation (6) in accordance with the target value of the leakage inductance. For the leakage transformer 1, a maximum value of the gaps between the bypass cores 15a is less than or equal to a value obtained by multiplying a minimum value of the gaps between the bypass cores 15a and each of the primary coil 11a and the secondary coil 12a by the positive coefficient m that is less than one. The gap between the bypass cores 15a is narrower than the gap in the case of the leakage transformer 5 illustrated in FIG. 12, thereby enabling suppression or prevention of the spreading of magnetic flux.

Figure 14:
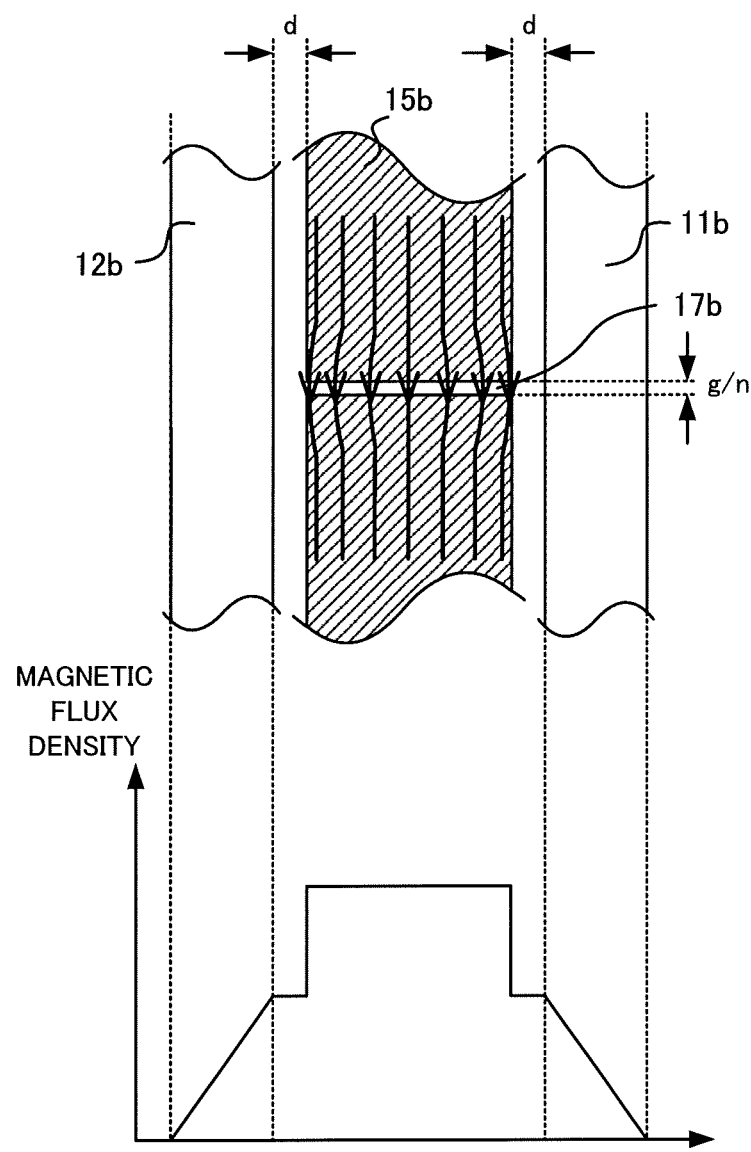
FIG. 14 is a drawing illustrating an example of magnetic flux passing through the bypass cores of the leakage transformer according to the embodiment.

FIG. 14 is a drawing illustrating an example of magnetic flux passing through the bypass cores of the leakage transformer according to the embodiment. The upper part of FIG. 14 is a magnified view of part of the upper part of FIG. 4, illustrating magnetic force lines of magnetic flux passing through the bypass cores 15b. The lower part of FIG. 14 illustrates a change of magnetic flux density that is generated in a gap 17b that is the gap between the bypass cores 15b. In the leakage transformer 1 according to the embodiment, the total value of the spacing direction length of the gaps 17b is equivalent to g in the aforementioned Equation (6). That is, the total value of the spacing direction length of the gaps 17b is determined in accordance with the target value of the leakage inductance L. The maximum value of the gap 17b of the leakage transformer 1 is less than or equal to the value obtained by multiplying the gap d between the bypass core 15b and each of the primary coil 11b and the secondary coil 12b by the positive coefficient m that is less than one. Further, the gap d is determined in accordance with the insulation design of the leakage transformer 1. In the case in which the gap between the bypass core 15b and the primary coil 11b and the gap between the bypass core 15b and the secondary coil 12b are different from each other, the maximum value of the gaps 17b of the leakage transformer 1 is set to be less than or equal to the value obtained by multiplying the minimum value of each of the gaps between the bypass core 15b and each of the primary coil 11b and the secondary coil 12b by the positive coefficient m that is less than one.

An example is described below in which equal gaps are arranged between n+1 bypass cores 15b between the primary coil 11b and the secondary coil 12b. In this case, the number n of the bypass cores 15b is determined such that the relationship of Equation (7) below is established. In Equation (7) below, m is greater than zero and less than one, and, for example, is 0.1.

Equation 7

$$\frac{g}{n} \leq m \cdot d \quad (7)$$

Due to the length of the gap 17b g/n being made sufficiently smaller than the gap d between the bypass core 15b and the primary coil 11b and the secondary coil 12b, the difference between the magnetic resistance Rg passing through the gap 17b and the magnetic resistance Ra passing through a position nearer the primary coil 11b or the secondary coil 12b than the gap 17b becomes larger than in the case of the leakage transformer 5 illustrated in FIG. 12. Such configuration has the effect of enabling suppression or prevention of the spreading of magnetic flux passing through the bypass core 15b, and has the effect of enabling suppression or prevention of interlinking of the primary coil 11b and the secondary coil 12b by the magnetic flux leaking from the bypass core 15b. Such effects enable suppression or prevention of the generation of eddy currents in the primary coil 11b and the secondary coil 12b. Each of the gaps between the bypass cores 15a and 15c are determined in a similar manner. Such configuration enables the suppression or prevention of the generation of eddy currents also in the primary coils 11a and 11c and the secondary coils 12a and 12c.

For the leakage transformer 1 according to the present embodiment in the aforementioned manner, the maximum value of the gaps between the bypass cores 15a is less than or equal to the value obtained by multiplying the minimum value of the gaps between the bypass core 15a and each of the primary coil 11a and the secondary coil 12a by the positive coefficient m that is less than one. In a similar manner, the maximum value of the gaps between the bypass cores 15b is less than or equal to the value obtained by multiplying the minimum value of the gaps between the bypass core 15b and each of the primary coil 11b and the secondary coil 12b by the positive coefficient m that is less than one. The maximum value of the gaps between the bypass cores 15c is less than or equal to the value obtained by multiplying the minimum value of the gaps between the bypass core 15c and each of the primary coil 11c and the secondary coil 12c by the positive coefficient m that is less than one. Further, the thickness t in the direction orthogonal to the central axes of the primary coils 11a, 11b, and 11c and the secondary coils 12a, 12b, and 12c is less than or equal to two times the skin depth δ due to the skin effect. Due to the above configuration, localized heating of the leakage transformer 1 can be suppressed or prevented.

Device size and installation location are restricted when the power converter 2 is mounted on the electric railway vehicle. In the leakage transformer 1 according to the present embodiment, localized heating in the leakage transformer 1 can be suppressed or prevented even without widening the respective gaps d between the bypass cores 15a, 15b, and 15c and each of the primary coils 11a, 11b, and 11c and the secondary coils 12a, 12b, and 12c. That is, even when device size and installation location are restricted as in the electric railway vehicle, the power converter 2 can be used that has the leakage transformer 1 according to the present embodiment.

Figure 15:
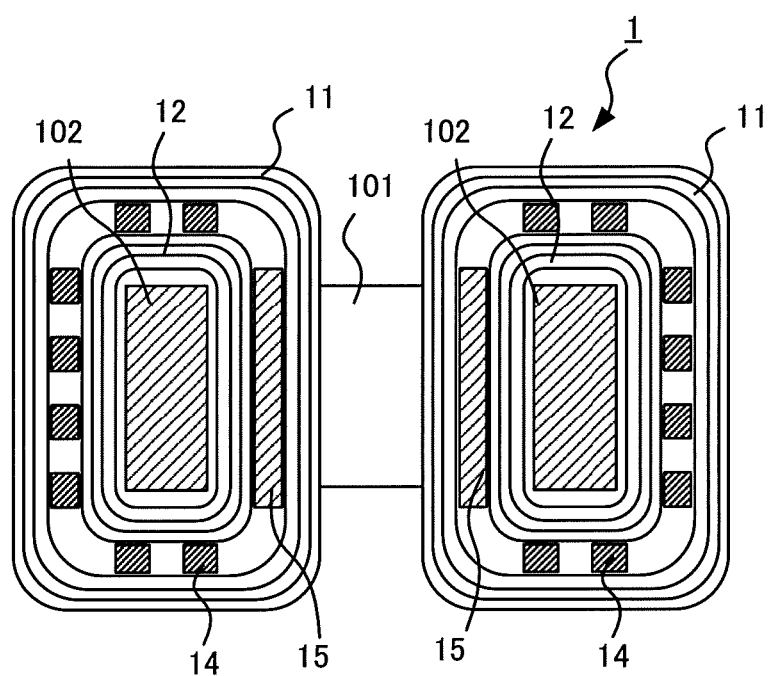
FIG. 15 is another cross-sectional view of the leakage transformer according to the embodiment.

Embodiments of the present disclosure are not limited to the aforementioned embodiment. FIG. 15 is another cross-sectional view of the leakage transformer according to the embodiment. The leakage transformer 1 may be a single-phase transformer. In the example of FIG. 15, the core 10 has two leg members 102, and the primary coil 11 and the secondary coil 12 are respectively wound around the leg members 102. The spacers 14 and the bypass cores 15 are arranged between the primary coil 11 and the secondary coil 12. Within the space between the primary coil 11 and the secondary coil 12, the bypass cores 15 are arranged at positions nearest the other leg member 102. In a manner similar to the aforementioned embodiment, the bypass cores 15 are arranged with gaps formed along the direction of the central axes of the primary coil 11 and the secondary coil 12.

Figure 16:
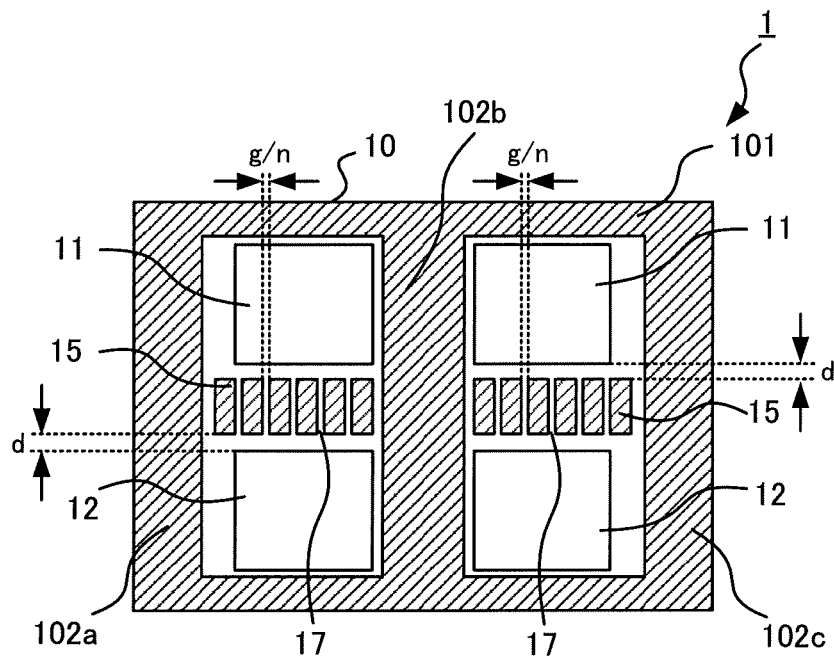
FIG. 16 is yet another cross-sectional view of the leakage transformer according to the embodiment.

FIG. 16 is yet another cross-sectional view of the leakage transformer according to the embodiment. In the example of FIG. 16, among the leg members 102a, 102b, and 102c of the core 10 illustrated in FIG. 2, the primary coil 11 and the secondary coil 12 are wound around the centrally positioned leg member 102b. The secondary coil 12 is wound around the leg member 102b at a position so as to form a gap with the primary coil 11 in a direction of extension of the leg member 102b. In the space between the adjacent leg member 102a and the leg member 102b, and in the space between the primary coil 11 and the secondary coil 12, the bypass cores 15 form spaces in the spacing direction between the leg member 102a and the leg member 102b. Further, in the space between the adjacent leg member 102b and the leg member 102c, and in the space between the primary coil 11 and the secondary coil 12, the bypass cores 15 form spaces in the spacing direction between the leg member 102b and the leg member 102c. In FIG. 16 in a manner similar to the aforementioned embodiment, the total value of the gaps between the bypass cores 15 is equal to g of the aforementioned Equation (6). Further, the maximum value of the gap 17 between the bypass cores 15 is less than or equal to the value obtained by multiplying the gap d, illustrated in FIG. 16, between the bypass core 15 and each of the primary coil 11 and the secondary coil 12 by the positive coefficient m that is less than one. Assuming that n+1 bypass cores 15 are lined up with equal gaps therebetween in the leakage transformer 1, the relationship of the aforementioned Equation (7) holds for the length of the gaps 17 g/n.

Figure 17:
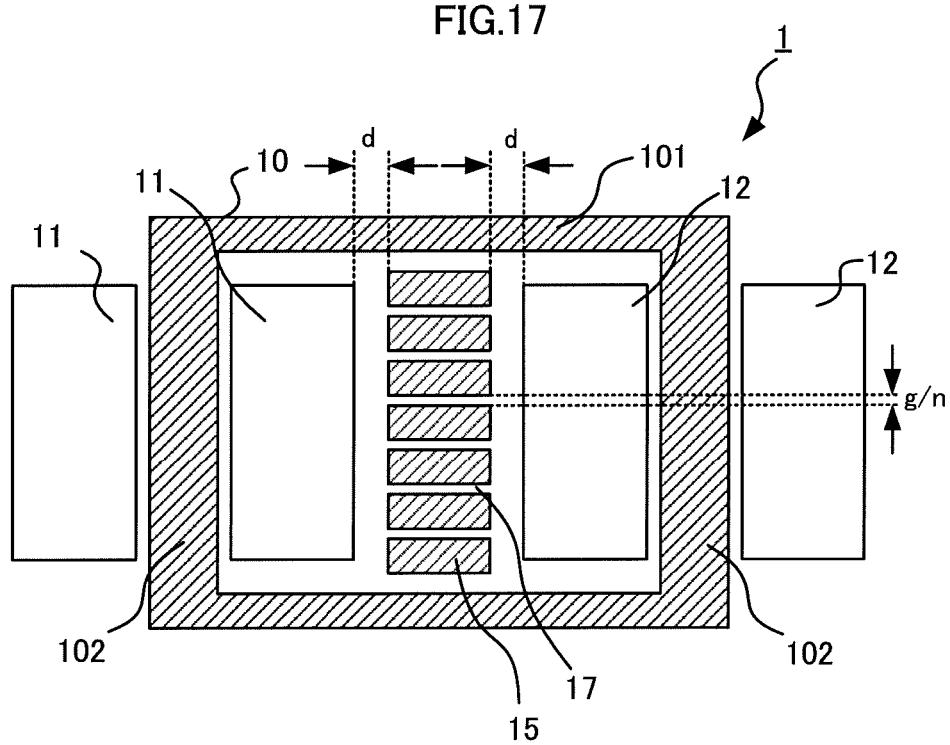
FIG. 17 is yet another cross-sectional view of the leakage transformer according to the embodiment.

FIG. 17 is yet another cross-sectional view of the leakage transformer according to the embodiment. In the example of FIG. 17, the utilized core 10 is similar to that of FIG. 15. The primary coil 11 is wound around one of the leg members 102, and the secondary coil 12 is wound around the other leg member 102. In the space between the primary coil 11 and the secondary coil 12, the bypass cores 15 are arranged forming gaps therebetween in the direction of opposition of the end portions 101. In FIG. 17 in the same manner as that of the aforementioned embodiment, the total value of the gaps between the bypass cores 15 is equivalent to g in the aforementioned Equation (6). Further, the maximum value of the gaps 17 between the bypass cores 15 is less than or equal to the value obtained by multiplying the gap d, illustrated in FIG. 17, between the bypass core 15 and each of the primary coil 11 and the secondary coil 12 multiplied by the positive coefficient m that is less than one. Assuming that n+1 bypass cores 15 are lined up with equal gaps therebetween in the leakage transformer 1, the relationship of the aforementioned Equation (7) holds for the length of the gaps 17 g/n.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST 1, 5 Leakage transformer
2 Power converter
3 Inverter device
4 Alternating current capacitor
10, 50 Core
11, 11a, 11b, 11c, 51 Primary coil
12, 12a, 12b, 12c, 52 Secondary coil
13 Clamper
14, 14a, 14b, 14c, 53 Spacer
15, 15a, 15b, 15c, 54 Bypass core
16 Leakage inductance
17, 17b, 55 Gap 101, 501 End portion
102, 102a, 102b, 102c, 502 Leg member
C1 Filter capacitor
SW1, SW2, SW3, SW4, SW5, SW6 Switching element

The invention claimed is:

1. A leakage transformer comprising:
a primary coil wound around a core;
a secondary coil wound around the core;
a plurality of bypass cores forming at least one gap therebetween in a direction of magnetic flux induced in the bypass cores, the bypass cores being disposed between the primary coil and the secondary coil, each bypass core of the bypass cores being a magnetic member to induce therein a portion of magnetic flux generated in the core; and
at least one non-magnetic member arranged between the bypass cores, wherein
the primary coil is wound around the core at an exterior of the secondary coil, in a space between the primary coil disposed at the exterior of the secondary coil and the secondary coil, the plurality of bypass cores is disposed forming the at least one gap therebetween,
a total value of the at least one gap between the bypass cores is determined in accordance with a particular value of a leakage inductance,
a maximum value of the at least one gap between the bypass cores is less than or equal to a value obtained by multiplying a minimum value of gaps between the bypass cores and each of the primary coil and the secondary coil by a positive coefficient that is less than one,
the core comprises two mutually-opposing end portions and a plurality of leg members, each end of the each of the leg members connecting to an end portion of the two mutually-opposing end portions,
the secondary coil is wound around a leg member of the plurality of leg members,
the primary coil is wound around the leg member at the exterior of the secondary coil, and
within a space between the primary coil and the secondary coil, the plurality of bypass cores is disposed forming the at least one gap at a position closest to a center of the plurality of leg members in a direction of disposal of the plurality of leg members.

2. The leakage transformer according to claim 1, wherein (i) a thickness of the primary coil in a direction orthogonal to a central axis of the primary coil and (ii) a thickness of the secondary coil in a direction orthogonal to a central axis of the secondary coil are each less than or equal to two times a skin depth generated at a frequency of current flowing in the primary coil.

3. The leakage transformer according to claim 1, wherein the core comprises two mutually-opposing end portions and three leg members, each end of each of the three leg members connecting to an end portion of the two mutually-opposing end portions, wherein
the primary coil is wound around a centrally disposed leg member of the three leg members,
the secondary coil is wound around the centrally disposed leg member at a position forming a gap with the primary coil in a direction of extension of the leg member,
between two adjacent leg members and between the primary coil and the secondary coil, the plurality of bypass cores is disposed forming gaps therebetween in a spacing direction between the two adjacent leg members.

4. The leakage transformer according to claim 1, wherein the core comprises two mutually-opposing end portions, and two leg members, each end of each of the two leg members connecting to an end portion of the two mutually-opposing end portions,
the primary coil is wound around one of the two leg members, the secondary coil is wound around another leg member, and in a space between the primary coil and the secondary coil, the plurality of bypass cores is disposed forming a gap therebetween in a direction of opposition of the two mutually-opposing end portions.

5. The leakage transformer according to claim 1, wherein an electronic circuit connected to a primary side of the leakage transformer comprises a switching element formed from a wide bandgap semiconductor comprising at least one of silicon carbide, a gallium nitride-based material, or diamond.

6. The leakage transformer according to claim 2, wherein within the space between the primary coil and the secondary coil, a spacer that is a non-magnetic member is disposed at a position other than the position closest to the center of the plurality of leg members in a direction of disposal of the plurality of leg member members.

7. The leakage transformer according to claim 2, wherein the core comprises two mutually-opposing end portions and three leg members, each end of each of the three leg members connecting to an end portion of the two mutually-opposing end portions, wherein
the primary coil is wound around a centrally disposed leg member of the three leg members,
the secondary coil is wound around the centrally disposed leg member at a position forming a gap with the primary coil in a direction of extension of the centrally disposed leg member, and
between two adjacent leg members and between the primary coil and the secondary coil, the plurality of bypass cores is disposed forming gaps therebetween in a spacing direction between the two adjacent leg members.

8. The leakage transformer according to claim 2, wherein the core comprises two mutually-opposing end portions, and two leg members, each end of each of the two leg members connecting to an end portion of the two mutually-opposing end portions,
the primary coil is wound around one of the two leg members,
the secondary coil is wound around another leg member, and
in a space between the primary coil and the secondary coil, the plurality of bypass cores is disposed forming a gap therebetween in a direction of opposition of the two mutually-opposing end portions.

9. The leakage transformer according to claim 2, wherein an electronic circuit connected to a primary side of the leakage transformer comprises a switching element formed from a wide bandgap semiconductor comprising at least one of silicon carbide, a gallium nitride-based material, or diamond.

10. A leakage transformer comprising:
a primary coil wound around a core;
a secondary coil wound around the core;
a plurality of bypass cores forming at least one gap therebetween in a direction of magnetic flux induced in the bypass cores, the bypass cores being disposed between the primary coil and the secondary coil, each bypass core of the bypass cores being a magnetic member to induce therein a portion of magnetic flux generated in the core; and at least one non-magnetic member arranged between the bypass cores, wherein a total value of the at least one gap between the bypass cores is determined in accordance with a particular value of a leakage inductance, a maximum value of the at least one gap between the bypass cores is less than or equal to a value obtained by multiplying a minimum value of gaps between the bypass cores and each of the primary coil and the secondary coil by a positive coefficient that is less than one, the core comprises two mutually-opposing end portions and a plurality of leg members, each end of each of the leg members connecting to an end portion of the two mutually-opposing end portions, the secondary coil is wound around a leg member of the plurality of leg members, the primary coil is wound around the leg member at an exterior of the secondary coil, within a space between the primary coil and the secondary coil, the plurality of bypass cores is disposed forming the at least one gap at a position closest to a center of the plurality of leg members in a direction of disposal of the plurality of leg members, and within the space between the primary coil and the secondary coil, a spacer that is a non-magnetic member is disposed at a position other than the position closest to the center of the plurality of leg members in a direction of disposal of the plurality of leg members.

11. The leakage transformer according to claim 3, wherein an electronic circuit connected to a primary side of the leakage transformer comprises a switching element formed from a wide bandgap semiconductor comprising at least one of silicon carbide, a gallium nitride-based material, or diamond.

12. The leakage transformer according to claim 4, wherein
an electronic circuit connected to a primary side of the leakage transformer comprises a switching element formed from a wide bandgap semiconductor comprising at least one of silicon carbide, a gallium nitride-based material, or diamond.

13. The leakage transformer according to claim 6, wherein
an electronic circuit connected to a primary side of the leakage transformer comprises a switching element formed from a wide bandgap semiconductor comprising at least one of silicon carbide, a gallium nitride-based material, or diamond.

14. The leakage transformer according to claim 7, wherein
an electronic circuit connected to a primary side of the leakage transformer comprises a switching element formed from a wide bandgap semiconductor comprising at least one of silicon carbide, a gallium nitride-based material, or diamond.

15. The leakage transformer according to claim 8, wherein
an electronic circuit connected to a primary side of the leakage transformer comprises a switching element formed from a wide bandgap semiconductor comprising at least one of silicon carbide, a gallium nitride-based material, or diamond.

16. The leakage transformer according to claim 10, wherein an electronic circuit connected to a primary side of the leakage transformer comprises a switching element formed from a wide bandgap semiconductor comprising at least one of silicon carbide, a gallium nitride-based material, or diamond.

17. The leakage transformer according to claim 10, wherein
(i) a thickness of the primary coil in a direction orthogonal to a central axis of the primary coil and (ii) a thickness of the secondary coil in a direction orthogonal to a central axis of the secondary coil are each less than or equal to two times a skin depth generated at a frequency of current flowing in the primary coil.

* * * * *